United States Patent [19]

Bradley et al.

[11] Patent Number: 5,011,264

[45] Date of Patent: Apr. 30, 1991

[54] WIDE LINEAR DYNAMIC RANGE OPTICAL MODULATOR

[75] Inventors: Eric M. Bradley, San Diego; Ronald F. Mathis, Ramona, both of Calif.

[73] Assignee: General Dynamics Corp., Electronics Divn., San Diego, Calif.

[21] Appl. No.: 458,156

[22] Filed: Dec. 28, 1989

[51] Int. Cl.⁵ .......................... G02B 27/42; H01S 3/10
[52] U.S. Cl. ............................... 350/162.24; 350/96.14
[58] Field of Search ............... 455/611, 612; 350/311, 350/355, 356, 162.19, 162.24, 96.14; 372/31, 32

[56] References Cited

U.S. PATENT DOCUMENTS

| | | | |
|---|---|---|---|
| 3,898,585 | 8/1975 | Heidrich et al. | 350/96.14 |
| 4,003,631 | 1/1977 | Biet et al. | 350/356 |
| 4,155,056 | 5/1979 | Cross et al. | 350/96.12 |
| 4,257,017 | 3/1981 | Bradley et al. | 330/4.3 |
| 4,265,534 | 5/1981 | Remijan | 356/2 |
| 4,345,212 | 8/1982 | Seppala et al. | 330/4.3 |
| 4,908,833 | 3/1990 | Chraplyvy et al. | 35/96.17 |
| 4,913,525 | 4/1990 | Asakura et al. | 372/32 |

OTHER PUBLICATIONS

Cordero, R. F.; "Thin Film Periodic-Waveguide Electro-Optic Switches and Amplitude Modulators . . . "; Wave Electron., vol. 3, #2, pp. 137-143, 1/78, abstract only provided.

"Sidelobe Suppression in Corrugated Waveguide Filters", by Cross and Kogelnik, Optics Letters, vol. I, No. 1, p. 43, Jul. 1977.

*Primary Examiner*—Nelson Moskowitz
*Attorney, Agent, or Firm*—Brown, Martin, Haller & McClain

[57] ABSTRACT

An optical modulator for generating an amplitude modulated optical signal. A signal generator generates an optical signal that is optically coupled to a tunable filter which shares a common optical axis with the signal generator. The tunable filter wavelength response varies in response to an electrical input control signal thereby providing an output amplitude modulated optical signal. An optical isolator is located between and shares a common optical axis with the signal generator and the tunable filter. The optical isolator is for preventing optical signals originating at the filter, traveling toward the signal generator, from impinging on the signal generator.

21 Claims, 1 Drawing Sheet

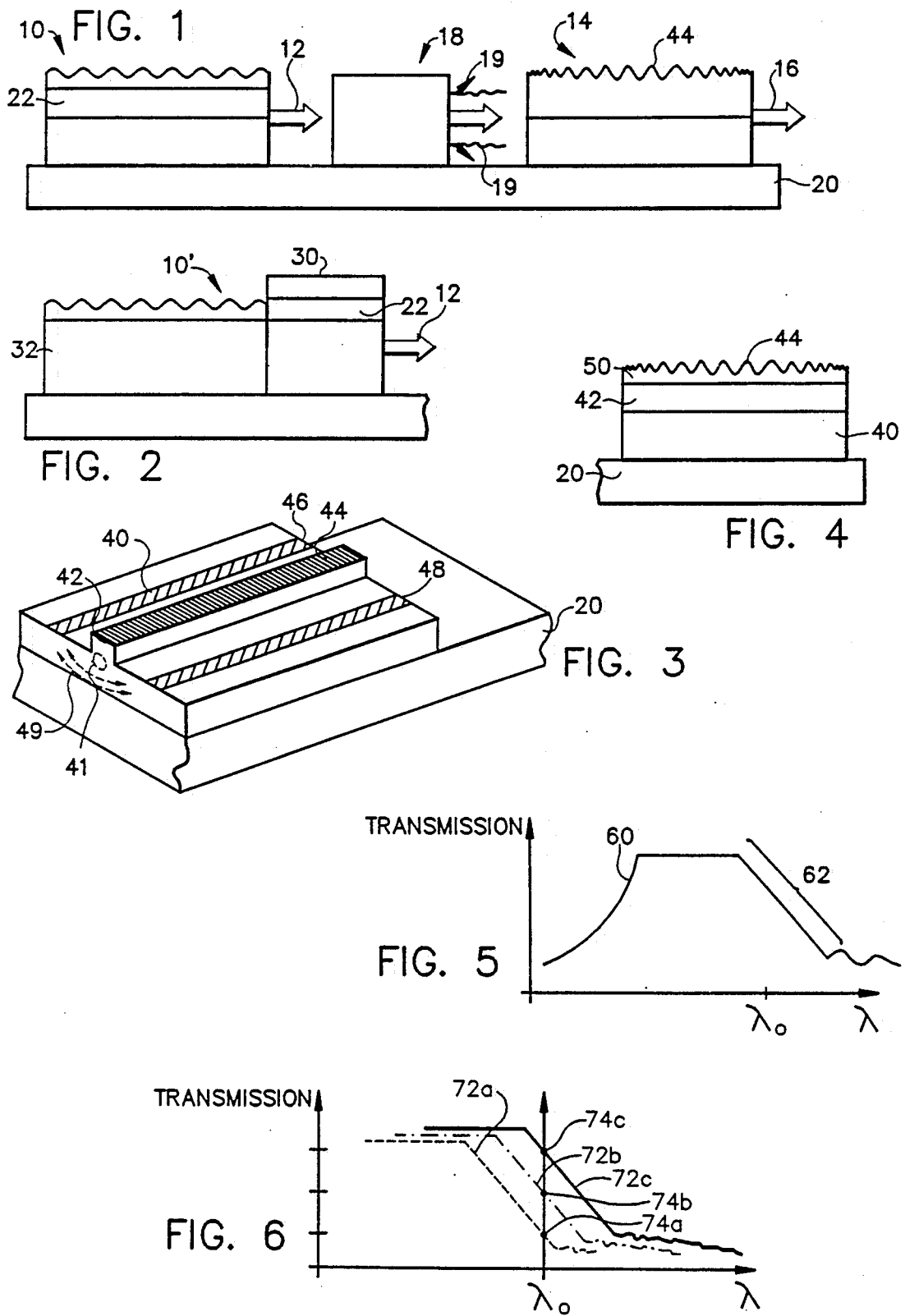

WIDE LINEAR DYNAMIC RANGE OPTICAL MODULATOR

BACKGROUND OF THE INVENTION

I. Technical Field

The present invention relates to integrated optics. More specifically, the present invention relates to optical modulators having wide linear dynamic range, useful in communication and computation systems employing optical frequency signals.

II. Background Art

Analog optical transmission has recently attracted renewed interest owing to the inherently low noise characteristics of fiber optics systems. With the advent of single mode systems, noise levels have been greatly reduced by eliminating modal noise within the fiber. Also, recent improvements in laser diodes have led to dramatically lower noise levels. With these advances in fiber optic technology, analog transmission becomes extremely attractive in applications where the desired signals at the terminal ends are analog, for example in commercial television. By eliminating the need for modulation conversion, the terminal equipment is greatly reduced in complexity and cost.

One remaining obstacle to widespread use of analog optical transmission is the intrinsic input current to output intensity nonlinearity of typical light emitting devices such as light emitting diodes or diode lasers. Distortion of the signal caused by nonlinearities can be a problem, particularly in multichannel systems, where a high degree of linearity is required to prevent interchannel cross-talk.

It is therefore desirable to have an optical modulator which has improved linearity over a wide dynamic range. Such an optical modulator would not rely on the input current to output intensity characteristics of the light generating device, but rather on the input to output characteristics of the modulator. Such a device having extremely linear response over a wide dynamic range would overcome the inherent limitations of previous optical modulation schemes.

SUMMARY OF THE INVENTION

The present invention provides a novel and improved optical modulator having linear modulation characteristics over a wide dynamic range. Thus, the present invention avoids the degraded performance caused by inherent input current to output intensity nonlinearities of the conventional light emitting device because the optical signal generated by the light emitting device of the present invention remains at a constant amplitude.

In the preferred embodiment the present invention is an optical amplitude modulator including signal generation means and tunable filter means. The signal generation means is typically a wavelength stabilized narrowband optical source for generating an optical signal. The generated optical signal enters the tunable filter means, typically an electrooptically active waveguide which shares a common optical axis with the signal generation means. The filter means is capable of varying its wavelength response in response to the variation of an input electrical filter control signal. The filter means receives the optical signal and the control signal so as to vary the amplitude of the input optical signal. The filter thus provides an output amplitude modulated optical signal. The apparatus may further include, located between and sharing a common optical axis with the signal generation means and the filter means, optical isolator means. The optical isolator means is for preventing optical signals reflected from or otherwise originating at the filter means which travel toward the signal generation means from impinging on the signal generation means.

The present invention generates an amplitude, i.e. intensity, modulated optical signal by passing a fixed amplitude, fixed wavelength, input optical signal through an optical filter having an electrically variable wavelength response. The optical filter has a Bragg-like grating corrugated surface tailored to provide the filter with a linear wavelength response. The filter response is characterized by a very linear (constant, non-zero) region over wavelength. The linear region is typically the long wavelength roll-off. The input signal is fixed at a wavelength which lies in this linear region. An electrical field, induced by the electrical control signal, passes through the filter. When the field is varied the linear region is shifted with respect to wavelength. In response, the filter linearly alters the amount of amplitude loss in the input signal induced at the input signal fixed wavelength. The filter output, is therefore an amplitude modulated signal at the wavelength of the input signal.

BRIEF DESCRIPTION OF THE DRAWINGS

These and other features, and advantages of the invention will become fully apparent from the detailed description set forth below when taken in conjunction with the drawings in which like reference characters correspond throughout and wherein:

FIG. 1 illustrates a side elevational view of the optical modulator apparatus of the present invention;

FIG. 2 illustrates an alternative configuration of the signal generation means of FIG. 1;

FIG. 3 shows a perspective view of the tunable filter means of the present invention;

FIG. 4 illustrates a side elevational view of an alternative configuration of the tunable filter means of;

FIG. 5 is a graph showing an exemplary wavelength response of the tunable filter means of the present invention; and FIG. 6 illustrates in graphical form the variation of the wavelength response of the tunable filter means of the present invention in response to the variation of an electrically filter control signal.

DETAILED DESCRIPTION OF THE PREFERRED EMBODIMENTS

An optical modulator in accordance with the present invention provides wide linear dynamic range modulation of steady state optical signals for optical communication systems as well as other systems employing optical frequency signals. Optical filters formed in electro-optic materials are utilized with a narrowband single wavelength optical source. Modulation is achieved by shifting the filter passband in wavelength.

The particular filter function for the optical filter is determined by requiring a very linear feature such as a roll-off. A wavelength stabilized narrowband optical source is used to send an optical signal through the filter. The filter wavelength response characteristic is shifted, through an electro-optic effect or other active optical effect, back and forth in wavelength to alternately reject or pass the optical signal.

A novel feature of the present invention is the use of filters which can be tailored to have extremely linear roll-off characteristics. This feature provides linear dynamic range superior to that of conventional modulators which inherently yield $(\cos)^2$ input to output characteristics, and cannot be tailored to increase linearity.

A schematic diagram of the preferred embodiment of the present invention is shown in FIG. 1. Diode laser 10 serves as a signal generation means for generating an optical signal indicated by arrow 12. The optical signal 12 is typically a fixed wavelength, fixed amplitude, narrowband signal.

Tunable filter 14 shares a common optical axis with laser 10. Filter 14 has a wavelength response which can be varied in response to an electrical filter control signal applied to the filter. Filter 14 receives the optical signal generated by laser 10 and the control signal. The amplitude of the received optical signal is varied as the wavelength response of the filter varies. Thus, tunable filter 14 is capable of generating an output amplitude modulated optical signal as indicated by arrow 16.

Located between and sharing a common optical axis with laser 10 and filter 14 is optical isolator 18. Isolator 18 is for preventing optical signals originating at, transmitted from, or reflected from filter 14 which travel toward laser 10 from impinging on laser 10 as indicated by arrows 19. Isolator 18 prevents laser 10 from being affected by signal being emitted by filter 14 which would otherwise be fed back to laser 10.

FIG. 1 further illustrates semiconductor substrate 20 although other materials, such as PLZT or LiNbO$_3$, may be used as a substrate. Substrate 20 provides a common semiconductor surface upon which laser 10, filter 14 and isolator 18 are formed. This structure results in the modulator of the present invention being a substantially monolithic integrated optical structure. Being monolithic, the modulator structure provides additional advantages including economy of space and power; and thermal variation and mechanical vibration.

In the preferred embodiment, such as illustrated in FIG. 1, laser 10 is a wavelength stabilized diode laser. Laser 10 includes active gain region 22 wherein the optical signal 12 is generated. Laser 10 may be a temperature stabilized distributed feedback laser as described in copending U.S. patent application Ser. No. 07/458,156, filed Dec. 28, 1989 entitled "DEVICE FOR TEMPERATURE STABILIZATION OF LASER DIODES" by the inventor hereof of which the disclosure is incorporated by reference.

The laser utilized may be a temperature stabilized laser 10' as shown in FIG. 2, also as described in the just mentioned co-pending U.S. Patent Application. Laser 10' employs a distributed Bragg reflector (DBR) as one of its cavity reflectors. So configured, laser 10' comprises active section 30 and DBR 32 for reflecting a constant stabilized wavelength, over a large temperature variation, into active Section 30.

FIG. 3 illustrates in more detail the tunable filter 14 of the present invention. FIG. 3 illustrates electrooptically active layer 40 formed upon substrate 20. Layer 40 comprises a material whose optical transmission characteristics are responsive to a varying electric field passing through the material. In the preferred embodiment, layer 40 comprises an oxide whose structure includes the elements, Pb, La, Zi, and Ta (PLZT).

Elongated mesa 42 is formed in layer 40 and serves as an optical waveguide for receiving at one end the optical signal and emitting at the other end the amplitude modulated optical signal. The received optical signal travels longitudinally through layer 40 parallel to mesa 42 substantially confined to an area demarcated by the dashed circle 41.

Corrugated grating 44 is formed in the top of mesa 42, and has striations of the grating running transverse to the longitudinal optical axis of mesa 42. Grating 44 is typically formed using electron beam or holographic photolithographic techniques.

Grating 44 comprises a corrugated surface wherein the depth of the corrugations vary along the length of mesa 42. The corrugation depth variation is controlled such that the Fourier transform curve of the corrugation depth as a function of distance has certain wavelength band wherein the slope of the curve is constant and not equal to zero. In certain configurations grating 44 is further constrained to having minimum corrugation depth at the extreme ends of mesa 42, as illustrated in FIG. 1.

Filter 14 further includes electrodes 46 and 48 which comprise elongated strips of conductive material formed respectively on opposite side of mesa 42, running the substantial length of mesa 42. Electrodes 46 and 48 are providing a means for inducing an electric field through mesa 42 and a portion of layer 40 thereneath in response to the application of an electrical signal thereto. The induced electric field runs transverse to the optical axis of mesa 42 as indicated by field lines 49. Electrodes 46 and 48 are typically formed using metalization and deposition methods well known in the art.

FIG. 4 shows a side view of an alternate configuration of filter 14. This configuration further includes dielectric layer 50 forming a surface on top of mesa 42, into which corrugated grating 44 is formed.

The wavelength response of an optical filter such as that shown in FIG. 3 is affected by the variation in corrugation depth of the Bragg-like grating formed on one of its faces. To some degree of accuracy, the wavelength response of the filter will have the shape of the Fourier transform of the corrugation depth variation as a function of distance along the span of the filter. With regard to the present invention, the wavelength response of filter 14 has a region having constant non-zero slope. An exemplary filter response is shown as curve 60 in FIG. 5, with the linear region being the long wavelength roll-off region 62. Such a response is attained by varying the corrugation depth of grating 44 to correspond to the inverse Fourier transform of curve 60.

Furthermore, mesa 42 of filter 14 is fabricated of an electro-optically active material such as a PLZT based oxide, whereby a variation in an electric field passing through the material varies the material's effective refractive index. A variation in refractive index has the effect of shifting the filter response in wavelength. Thus, the filter of the present invention is capable of shifting the wavelength band wherein the filter response is linear.

FIG. 6 illustrates the corner frequency of region 62 shifting as the magnitude of the electric field passing through the material varies. Curves 72a–72c represent the position of the long wavelength roll-off region of wavelength response of filter 14 as three different respective electric potentials are applied across electrodes 46 and 48. Thus, varying an electrical filter control signal applied across electrodes 46 and 48 correspondingly varies the corner wavelength of region 62.

The input optical signal generated by laser 10 and received by filter 14 lies somewhere within linear wavelength band 62 at fixed frequency $\lambda_o$ shown in FIG. 6. As region 62 shifts in response to the electrical filter control signal the loss induced by filter 14 at $\lambda_o$ changes, thereby altering the amplitude of the optical signal it transmits. Points 74a-74c of FIG. 6 respectively indicate the amplitude of the output optical signal of filter 14 corresponding the filter response to curves 72a-72c respectively. Thus the amplitude modulator of the present invention is capable of generating an amplitude modulated optical signal having a dynamic range substantially equal to the power of the input optical signal.

The previous descriptions of the preferred embodiments are provided to enable any person skilled in the art to make or use the present invention. Various modifications to these embodiments will be readily apparent to those skilled in the art, and the generic principles defined herein may be applied to other embodiments without the use of the inventive facility. Thus, the present invention is not intended to be limited to the embodiments shown herein, but is to be accorded the widest scope consistent with the principles and novel features enclosed herein.

We claim:

1. An apparatus for generating an amplitude modulated optical signal comprising:
   signal generation means for generating an input optical signal at a wavelength;
   tunable filter means, sharing a common optical axis with said signal generation means, for receiving said optical signal, said filter means responsive to an input control signal for varying the amplitude of said optical signal in a manner linear with said wavelength and for providing an output amplitude modulated optical signal; and
   optical isolator means, located between and sharing said common optical axis with said signal generation means and said filter means, for preventing optical signals originating at said filter means traveling towards said signal generation means from impinging on said signal generation means.

2. The apparatus of claim 1 wherein said signal generation means, said tunable filter means, and said optical isolator means are all formed on a common semiconductor substrate.

3. The apparatus of claim 1 wherein the signal generation means comprises a wavelength stabilized laser.

4. The apparatus of claim 3 wherein said laser is a distributed feedback laser diode.

5. The apparatus of claim 3 wherein said laser further comprises a distributed Bragg reflector coupled thereto.

6. The apparatus of claim 1 wherein said filter means comprises:
   an optical waveguide formed of electro-optically active material and having a corrugated grating topology along a face parallel to the optical axis of said wave guide, wherein striations of said grating are transverse to said optical axis; and
   tuning means comprising first and second electrodes each disposed on an opposite side of said optical waveguide for inducing an electrical field through said waveguide transverse to said optical axis.

7. The apparatus of claim 6 wherein said grating has a corrugation depth variation with distance having a Fourier transform curve which has a certain wavelength band wherein the slope of said curve is constant and not equal to zero.

8. The apparatus of claim 6 wherein the corrugation depth of said grating is at a minimum at the longitudinal ends of said optical waveguide.

9. The apparatus of claim 1 wherein said filter means comprises:
   an optical waveguide formed of electro-optically active material;
   a dielectric layer formed upon said waveguide and having a corrugated grating topology along a face parallel to the optical axis of said wave guide, wherein striations of said grating are transverse to said optical axis, together with said waveguide for, and further, wherein said grating has a corrugation depth variation with distance having a Fourier transform curve which has a certain wavelength band wherein the slope of said curve is constant and not equal to zero; and
   tuning means for inducing an electrical field through said waveguide transverse to said optical axis.

10. The apparatus of claim 9 wherein said grating has a corrugation depth variation with distance having a Fourier transform curve which has a certain wavelength band wherein the slope of said curve is constant and not equal to zero.

11. The apparatus of claim 9 wherein the corrugation depth of said grating is at a minimum at the longitudinal ends of said optical waveguide.

12. The apparatus of claim 1 wherein said filter means exhibits a wavelength response having at least a certain wavelength band wherein optical transmissivity varies substantially linearly with change in wavelength.

13. The apparatus of claim 12 wherein the center of said certain wavelength band shifts in response to a variation of said electrical filter control signal.

14. The apparatus of claim 12 wherein the wavelength of said optical signal lies within said certain wavelength band.

15. The apparatus of claim 12 wherein said certain wavelength band is a region of the long wavelength roll-off of said wavelength response, and further wherein the corner wavelength of said roll-off is capable of shifting in response to the variation of said electrical filter control signal.

16. An optical modulator comprising:
   a substrate;
   an electro-optically active layer formed upon said substrate, said active layer further defining an elongated mesa, said mesa having a corrugated grating topology along a face parallel to the elongation of said mesa, wherein the striations of said grating are transverse to said optical axis, and further, wherein said grating has a corrugation depth variation with distance having a Fourier transform curve which has a certain wavelength band wherein the slope of said curve is constant and not equal to zero; and
   first and second electrodes comprising elongated strips of conductive material formed on either side of said mesa on said electro-optically active layer, running the substantial length of said mesa.

17. The optical modulator of claim 16 wherein said corrugated grating is formed using electron beam photolithographic techniques.

18. The optical modulator of claim 16 wherein said corrugated grating is formed using holographic photolithographic techniques.

19. An optical modulator comprising:
    a substrate;

an electro-optically active layer formed upon said substrate, said active layer further defining an elongated mesa;

a dielectric layer formed upon said mesa and having a corrugated grating topology along a face parallel to the elongation of said mesa, wherein striations of said grating are transverse to said optical axis; and first and second electrodes comprising elongated strips of conductive material formed on said electro-optically active layer on either side of said mesa, running the substantial length of said mesa.

20. The optical modulator of claim 19 wherein said corrugated grating is formed using electron beam photolithographic techniques.

21. The optical modulator of claim 19 wherein said corrugated grating is formed using holographic photolithographic techniques.

* * * * *